United States Patent [19]

Wilson

[11] Patent Number: 5,964,940
[45] Date of Patent: Oct. 12, 1999

[54] PROCESS FOR INCREASING THE WATER SOLUBILITY OF GYPSUM

[76] Inventor: Harold W. Wilson, 6985 Market Ave., El Paso, Tex. 79915

[21] Appl. No.: 09/062,710

[22] Filed: Apr. 20, 1998

[51] Int. Cl.[6] .................................................. C04B 11/00
[52] U.S. Cl. ......................... 106/772; 106/783; 423/555
[58] Field of Search .................................. 106/772, 783; 423/555

[56] References Cited

U.S. PATENT DOCUMENTS

| | | | |
|---|---|---|---|
| 1,746,717 | 8/1930 | Simpson | 423/555 |
| 1,943,497 | 1/1934 | Bichowsky | 23/122 |
| 2,021,910 | 11/1935 | Crundali | 423/555 |
| 2,822,242 | 2/1958 | Doll et al. | 423/172 |
| 2,956,859 | 10/1960 | Rodgers et al. | 423/172 |
| 2,999,007 | 9/1961 | McKenzie et al. | 23/122 |
| 3,860,409 | 1/1975 | Wilson | 71/62 |
| 4,360,386 | 11/1982 | Bounini | 106/772 |
| 4,387,083 | 6/1983 | Weterings et al. | 423/555 |
| 4,432,954 | 2/1984 | Quante | 423/171 |
| 5,169,444 | 12/1992 | Boos et al. | 106/772 |
| 5,590,983 | 1/1997 | Angell | 405/263 |

FOREIGN PATENT DOCUMENTS 319228  10/1929  United Kingdom.

OTHER PUBLICATIONS

WPIDS Abstract No. 98–189043, abstract of Japanese Patent Specification No. 10–045446, Feb. 1998.

Soil, The Yearbook of Agriculture, 1957, U.S. Department of Agriculture, p. 286 No Month.

The Merck Index, 7th Edition, Merck & Co., Inc. Rahway N.J., 1960, "Calcium Sulfate", p. 198 No Month.

*Primary Examiner*—Anthony Green
*Attorney, Agent, or Firm*—Jacobson, Price, Holman & Stern, PLLC

[57] ABSTRACT

A process for increasing the water solubility of gypsum in which gypsum is ground to about 5 to 50 mesh U.S. Standard Sieve Size, about 5 to 95 parts by weight of ground gypsum are mixed with about 2 to 25 parts by weight concentrated sulfuric acid having a concentration of about 93 to 98.5% $H_2SO_4$, optionally in the presence of about 5 to 20 parts by weight water, and the resulting product is dried at a temperature of about 100–125° C. to form a water-soluble, granular, solid, free-flowing gypsum product having a water solubility increased by about 2- to greater than 350-fold.

13 Claims, No Drawings

PROCESS FOR INCREASING THE WATER SOLUBILITY OF GYPSUM

BACKGROUND OF THE INVENTION

1. Field of the Invention

The present invention relates to a process for increasing the water solubility of gypsum by treating the gypsum with concentrated sulfuric acid. The reaction product is useful for treating soils.

2. Description of the Related Art

Anhydrous calcium sulfate occurs in nature as the mineral anhydrite. The dihydrate, or gypsum ($CaSO_4 \cdot 2H_2O$) is, however, more common. The groups of gypsum products include calcined building materials. Calcined gypsum is employed in making wallboard and various other products.

Calcium sulfate is soluble in 375 parts cold water or 485 parts boiling water. Its solubility in water is increased by acids, ammonium chloride, or nitrate; it is diminished by magnesium sulfate. *The Merck Index*, p. 198 (7th Edition 1960). The U.S. Department of Agriculture 1957 Yearbook entitled "Soil" also refers to the solubility of gypsum at page 286, paragraph 2. In particular, the rate of reaction of gypsum is limited only by its solubility which is about 0.25%. Under field conditions, the application of three- to four-acre feet of irrigation water is required to dissolve four or five tons of high grade agricultural gypsum. In this regard, there are 2,715,400 pounds of water, or 325,978 gallons of water, to one-acre foot of water.

As a result of these properties, gypsum has a very limited degree of water solubility. Gypsum also has a very restricted reactivity especially with respect to its agricultural application to soils.

SUMMARY OF THE INVENTION

It is an object of the present invention to provide an improved process for increasing the water solubility of gypsum.

It is another object of the present invention to provide a process for producing a water-soluble, granular, solid, free-flowing gypsum product.

It is yet another object of the present invention to provide a gypsum product which is suitable for application to agricultural soils for their benefication.

The process of the present invention includes mixing ground gypsum with concentrated sulfuric acid with or without the addition of water. The reaction product is then dried at a temperature of about 100–125° C. The water solubility of the gypsum is increased from about 2- to in excess of 350-fold.

The gypsum may be virgin gypsum or calcined gypsum such as gypsum wallboard. The gypsum is ground to about 5–50 mesh U.S. Standard Sieve Size prior to being admixed with the concentrated sulfuric acid. Preferably, about 5–95 parts by weight of ground gypsum are mixed with about 2–25 parts by weight of concentrated sulfuric acid (about 93 to 98.5% $H_2SO_4$). Water may be added to the reaction mixture in a quantity of about 5 to 20 parts by weight.

The product resulting from this process can be used in nutrification and benefication of agricultural soils. Plant nutrients can be mixed with the ground gypsum and concentrated sulfuric acid or can be added to the gypsum product to supplement the nutrification and benefication properties of the product.

DESCRIPTION OF THE PREFERRED EMBODIMENTS

In accordance with the present invention, a process is provided for altering the physical structure and chemical reactivity of gypsum to effect large increases of water solubility without introducing any ionic matter foreign to calcium sulfate dihydrate. The process is usable for altering virgin gypsum ($CaSO_4 \cdot 2H_2O$) as well as various gypsum products. These gypsum products include calcined gypsum [$CaSO_4 \cdot \frac{1}{2}H_2O$ (hemihydrate)] such as gypsum wallboard (e.g., used gypsum wallboard with or without surface coatings, decorations, or treatments). Used gypsum wallboard is currently considered a waste material of construction and is discarded because of lack of any perceived value. Thus, used gypsum wallboard is currently consigned to landfills or soil burial vaults.

By using the process of the present invention, gypsum can be easily, readily and economically converted into a water-soluble, granular, solid, free-flowing gypsum product for application to agricultural soils for their benefication. This can be accomplished by admixing ground gypsum particles (e.g., gypsum wallboard particles) ranging in size from about 5 to 50 mesh U.S. Standard Sieve Size, and generally in the absence of any added water, with various amounts of concentrated sulfuric acid (e.g., 93.17% $H_2SO_4$).

The process of the present invention produces a form of water-soluble calcium hydrate which, if it could be isolated in pure form, would be designated chemically as a compound known as calcium bisulfate dihydrate which has never been isolated in the pure state. However, my experimentations and studies have shown that in the presence of an excess of ionized particles of calcium sulfate hydrate, and in the presence of acid sulfate ions ($HSO_4^-$) from concentrated sulfuric acid, an ionic rearrangement takes place. This ionic rearrangement is apparent from measurable changes in the specific ionic conductance, and its attendant equivalent conductance values, of the system and dictate an ionic formula fully in agreement with the formula which would designate the water soluble compound calcium bisulfate dihydrate: $Ca^{+2}(HSO_4^-)_2 \cdot 2H_2O$. Thus, this compound is believed to be formed when gypsum and other hydrated forms of even partially ionized calcium sulfate are admixed with concentrated sulfuric acid containing acid sulfate ions ($HSO_4^-$) as illustrated in Equation 1:

Equation 1

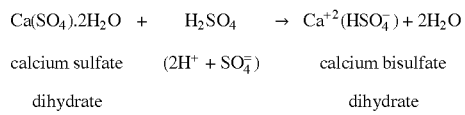

$$Ca(SO_4) \cdot 2H_2O \;+\; H_2SO_4 \;\rightarrow\; Ca^{+2}(HSO_4^-) + 2H_2O$$

calcium sulfate dihydrate    ($2H^+ + SO_4^=$)    calcium bisulfate dihydrate

With the use of an additional stoichiometric amount, or even less, of the concentrated sulfuric acid, the reaction above can proceed even further to the right as demonstrated experimentally and produce water-soluble, granular, solid, free-flowing gypsum products as shown below in Equation 2:

Equation 2

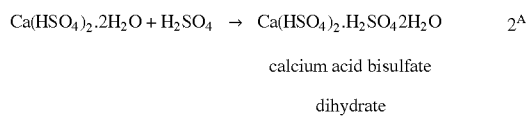

$$Ca(HSO_4)_2 \cdot 2H_2O + H_2SO_4 \;\rightarrow\; Ca(HSO_4)_2 \cdot H_2SO_4 2H_2O \quad\quad 2^A$$

calcium acid bisulfate dihydrate

This strongly acid product can be used to react with additional gypsum or can be used to react with alkaline soil for pH reduction.

Repetitive experiments have shown without exception that the water solubilities of every sample lot of gypsum or calcined gypsum were increased anywhere between 2-fold and in excess of 350-fold depending upon the amount of concentrated sulfuric acid present. This includes decimated dry, gypsum wallboard with or without any added plant nutrient compounds.

Combinations such as a mixture of ten (10) parts by weight of a ground-to-pass 10 mesh U.S. Standard Sieve Size gypsum wallboard (including its calcined gypsum core and coatings of paper, glue, paint, retarder, etc.) with ten (10) parts by weight of added urea (46% N content plant food) produced in accordance with the invention one hundred (100) parts by weight of a plant food containing acidified gypsum dry wallboard granular product. This product was over 73% water soluble at ambient temperature whereas the original gypsum wallboard had a measured water solubility of 0.18% at ambient temperature prior to its being combined with the concentrated sulfuric acid and the other ingredients of the process.

Examples of products which can be produced in accordance with the present invention include, for example, products prepared from use of various pre-selected amounts of ground gypsum or ground gypsum wallboard. Preferably, about 5 to 95 parts by weight of gypsum are thoroughly admixed with about 2 to 25 parts by weight concentrated sulfuric acid (about 93 to 98.5% $H_2SO_4$) where the larger the amount of ground gypsum or gypsum wallboard used the larger the amount of concentrated sulfuric acid could be required. After thoroughly combining the ground gypsum with the specified acid, a limited amount (about 5 to 20 parts by weight) of water may be slowly incorporated into the gypsum mixture. The water may be added primarily to effect the desired degree of granulation and secondarily for some degree of chemical conditioning. Thereafter, the resultant product can be dried at 100°–125° C., if required, for packaging.

A wide variety of gypsum-based chemical compositions of matter having controllable water solubilities can be produced. All of such products are highly suitable for use in nutrification and benefication of agricultural soils in general. At the same time, strongly acidic to slightly acidic products of varying degrees of acidity for use for partial or complete alkali neutralization may be combined with such products having various degrees of water solubilities. Thus, controllable release of all the plant nutrient contents in a gypsum matrix can be produced by use of this invention.

Mixtures of gypsum with various amounts of concentrated sulfuric acid can be admixed with gypsum that has not been exposed to such treatment. The resulting mixtures can in turn be combined with various amounts of different plant nutrients to produce wide varieties of variable pH value mixtures for both soil corrections and plant nutrification. Introduction of large amounts of concentrated sulfuric acid into ground gypsum wallboard will allow application of products in specific soil locations as desired from testing the soils for the degree of alkalinity, and will allow use of such in-place applications for specific treatments of soil acidification practices.

Especially noteworthy would be the wide availability of superior, relatively inexpensive forms of gypsum products made to have varying degrees of water solubilities to permit wide usages of far less gypsum (as modified by this invention) than the very large amounts being currently used in soil treatments. At the same time, a minimalization or near total elimination of incorporation of so-called waste gypsum wallboard into landfills is achievable and a real possibility.

The foregoing should be considered as illustrative only of the principles of the invention. Since numerous applications of the present invention will readily occur to those skilled in the art, it is not desired to limit the invention to the specific examples disclosed or the exact process described. Rather, all suitable modifications and equivalents may be resorted to falling within the scope of the invention.

I claim:

1. A process for increasing the water solubility of gypsum and to form water-soluble, granular, solid, free-flowing gypsum after drying comprising (1) mixing ground gypsum with sufficient concentrated sulfuric acid having a concentration of about 93 to 98.5% $H_2SO_4$, to form water-soluble, granular, solid, free-flowing gypsum, and (2) drying the mixture of ground gypsum and concentrated sulfuric acid to form the water-soluble, granular, solid, free-flowing gypsum.

2. The process of claim 1, wherein the gysum is ground to about 5 to 50 mesh U.S. Standard Sieve Size.

3. The process of claim 1, wherein about 5 to 95 parts by weight of the ground gypsum is mixed with about 2 to 25 parts by weight of the concentrated sulfuric acid.

4. The process of claim 1, wherein about 5 to 20 parts by weight of water is added to the mixture.

5. The process of claim 1, wherein the gypsum product is dried at about 100–125° C.

6. The process of claim 1, wherein the water solubility of the gypsum is increased from about 2- to greater than 350-fold.

7. The process of claim 1, wherein the gypsum is virgin gypsum or calcined gypsum.

8. The process of claim 7, wherein the calcined gypsum is gypsum wallboard.

9. The product produced by the process of claim 1.

10. A process for increasing the water solubility of virgin or calcined gypsum comprising grinding the gypsum to about 5 to 50 mesh U.S. Standard Sieve Size, mixing about 5 to 95 parts by weight of the ground gypsum with about 2 to 25 parts by weight of concentrated sulfuric acid having a concentration of about 93 to 98.5% $H_2SO_4$, optionally in the presence of about 5 to 20 parts by weight water, and drying the resulting product at a temperature of about 100–125° C.

11. The process of claim 10, wherein the calcined gypsum is gypsum wallboard.

12. The process of claim 10, wherein the water solubility of the gypsum is increased from about 2- to greater than 350-fold.

13. The product produced by the process of claim 10.

\* \* \* \* \*